Oct. 16, 1962   J. B. BEAMAN ET AL   3,058,531
TWIN SHEAR DISC TOOL FOR MULCHING AND THE LIKE
Filed Sept. 23, 1959

INVENTORS
John B Beaman
BY
Shoemaker & Mattare
ATTORNEYS

United States Patent Office 3,058,531
Patented Oct. 16, 1962

3,058,531
TWIN SHEAR DISC TOOL FOR MULCHING
AND THE LIKE
John B. Beaman, 815 Church St., Ahoskie, N.C., and
Vivian L. Ott, 6100 Sylvan Ave., Norfolk 8, Va.
Filed Sept. 23, 1959, Ser. No. 841,743
9 Claims. (Cl. 172—15)

This invention relates to gardening implements in general and pertains, more particularly, to a twin disc cutting implement particularly suited and adapted for mulching, weed removal and edging, as well as related and allied operations.

Of primary concern in connection with the present invention is the provision of a gardening implement or tool employing a pair of disc members having cutting edges closely cooperable with each other to achieve a mulching, or cutting action as the implement is used.

Another object of this invention is to provide a gardening implement or tool which consists essentially of a pair of rotatable cutting discs disposed in angular relationship to each other and with their cutting edges disposed in close adjacency to each other so that as the tool is forced or pushed through a mass of soil, or the like, the discs will be caused to be rotated to effect therebetween a cutting or chopping action for mulching soil, removing weeds, edging grass or similar operations.

A further object of this invention resides in the provision of a gardening tool employing a pair of cooperable cutting discs each mounted for rotation independently of the other and cooperable to establish a tendency to rotate together for effecting the cutting action and wherein at least one of the discs is spring biased to a position in close adjacency to the other, while yet permitting the two discs to separate should such separation become necessary during the course of normal operation of the tool, such as when rocks or rather relatively large obstacles are encountered.

A further object of this invention is to provide a novel gardening implement assemblage including a fork carrying a pair of hubs for journalling therein individual and separate cutting discs, the discs being angulated relative to each other and being disposed at one point along their periphery in close adjacency to each other to present a cutting nip therebetween.

Still another object of this invention is to provide an assemblage in accordance with the immediately preceding object wherein the discs are disposed at an acute angle relative to each other and wherein at least one of the discs is spring biased into its normal position closely adjacent the other, while yet permitting relative separation between the discs.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

Figure 1:
FIG. 1 is a perspective view of the gardening implement constructed in accordance with this invention and illustrating the mounting and relative positioning of the two disc members.
Figure 2:
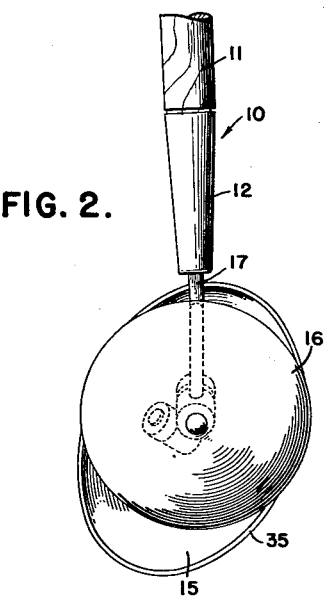
FIG. 2 is a side elevational view of the assembly shown in FIG. 1, taken from the side thereof having the smaller disc.

Referring now more particularly to FIG. 1, the reference character 10 indicates, in general, the tool in accordance with this invention which will be seen to include a conventional elongate wooden handle 11 having a ferrule 12 snugly receiving its lower end. The head of the tool is indicated generally by the reference character 13 and includes a mounting fork indicated generally by the reference character 14 and a pair of disc members 15 and 16.

The mounting fork includes a stem 17 which is embedded in the lower end of the handle 11 and which extends axially therefrom. The main body of the fork incorporates a pair of spaced leg members 18 and 19 interconnected by an arched bight portion 20 which is rigidly affixed or integrally formed with the stem 17.

Leg 18 terminates at its free end in a generally cylindrical boss 21 having a bore therethrough transversely extending with respect to the leg 18 and which rotatably receives a stub shaft 22. The stub shaft 22 is fixed to the disc 15 in normal relation with respect thereto and is fixed at a point corresponding to the geometric center of the disc. The other leg 19 also terminates in an enlarged generally cylindrical boss 23 having a transverse bore therethrough which receives the stub shaft 24. Stub shaft 24 is rigidly affixed at one end to the disc 16 at its geometric center and in normal relationship thereto.

Figure 3:
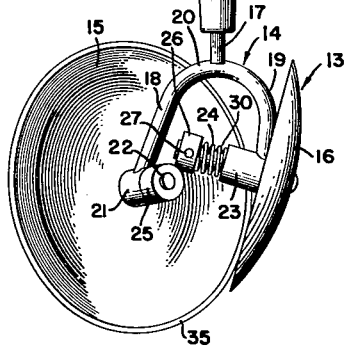
FIG. 3 is a top plan view of the head assembly including its mounting means.
Figure 4:
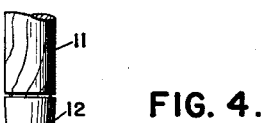
FIG. 4 is a rear perspective view of the tool.

Each stub shaft is maintained in captive position with respect to its corresponding leg 18 or 19 through the medium of stop collars 25 and 26 respectively. The stop collar 26 is pinned to its corresponding stub shaft as, for example, by a transverse retaining pin 27 as illustrated in FIG. 1 in the instance of stub shaft 24. FIG. 3 illustrates the pin 28 which retains the other stop collar 25 fixed to the stub shaft 22. The stop collar 25 is fixed to the stub shaft 22 in such position thereon as to permit axial movement of the stub shaft only by a sufficient amount as to provide for a normal or adequate end play or clearance so as to readily permit rotation of the stub shaft in the boss 21.

The stop collar 26, however, is spaced on stub shaft 24 some distance from the corresponding end face of the boss 23 so as to permit a limited amount of axial movement of the stub shaft 24, as will be evident hereinafter. However, to normally maintain the relative positioning between the disc 16 and the boss 23, a compression spring 30 is interposed between the opposed end faces of the boss 23 and the stop collar 26 at which spring is preloaded so as to maintain the relative positioning as is illustrated in FIG. 1.

It will be noted that the disc 16 is of smaller diameter than the disc 15 and for this reason, the leg 19 is somewhat shorter than the leg 18. It will also be noted that the two bosses 21 and 23 are angulated with respect to each other so as to present the two discs 15 and 16 in acutely angled relationship one with respect to the other, and with the two discs having their peripheral portions disposed in close adjacency as can be better appreciated from FIG. 3. Both discs are, moreover, of concavo-convex configuration approximating surfaces of spheres. Each disc is ground away or otherwise flattened on its concave side in its peripheral region as indicated, for example, by the reference characters 35 and 36, see particularly FIG. 3, thus presenting relatively sharp peripheral cutting edges on each disc. It will be noted that the smaller disc 16 overlaps slightly the larger disc 15 and that the two discs are at one point disposed in physical contact. The planes containing the cutting edges of the discs are disposed at acute angles relative to each other to present a tapered crotch 40 therebetween and at their point of closest relationship a cutting nip is presented.

Since each disc is free to rotate, it will be seen that if the device is, for example, forced into soil and then pushed along through the soil, the two discs will rotate and the tendency will be for one disc to impart a corresponding rotational action on the other and in this manner a mulching action or cutting action will be achieved which will also be beneficial for removing weeds or cutting vegetation and particularly, for example, the roots thereof. For example, the device could be used for edging along a walk. The convex sides of the two discs are disposed on the outer sides of the tool head, with the concavities of the two discs, in general, facing towards each other. This concavity permits the tool to be guided along a walkway, for example, for edging purposes without interfering or damaging the cutting edges of the two discs and presents a very good means for guiding the tool. The tool is very easily guided under any circumstances.

It will also be noted that the cutting nip is not presented at that point on the larger discs 15 which represents the point which would make contact with a flat surface when the tool handle is held in a normal position, but that such point of contact would be just ahead of the nip. This permits the tool to be maintained below the surface of the ground and effect a scooping up as well as a chopping action on the soil which it encounters. The net effect of the two discs in operation is not only that achieved by the cutting action therebetween, but also it will be noted that there is a compressing action which will be achieved between the two discs by virtue of their acute angular disposition and the concavity imparted to the opposed faces thereof. Such action will further enhance the mulching effect, for example, which the tool is capable of exerting. When the tool encounters material which exerts a spreading or separating force between the discs which is capable of overcoming the spring tension of the spring biasing means 30, such spreading action can occur to prevent damage or undue stress being applied to the tool head.

Figure 5:
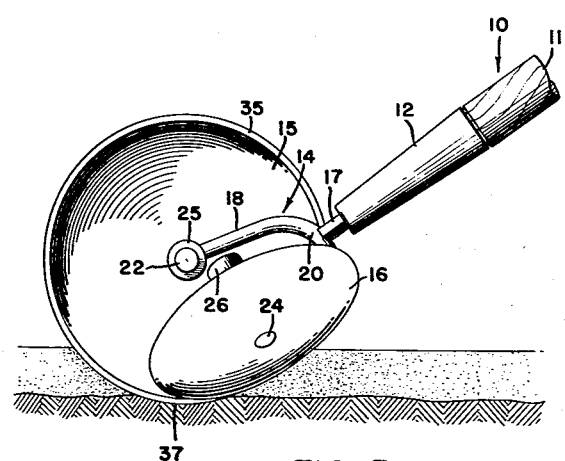
FIG. 5 is a perspective view illustrating the tool in use.

In actual use, the larger disc 15 is disposed in a more nearly vertical position than is the smaller disc and indeed it will frequently be used with the large disc in a substantially vertical position much in the manner as is illustrated in FIG. 5. This places the aforementioned lowermost contacting point 37 ahead of the nip between the two discs and also assures that the larger disc, which effects the greatest guiding action on the tool, will be in such position as to move in a more or less straight line.

We claim:

1. A twin disc gardening tool comprising an elongate handle having a cutting head affixed to one end thereof, said cutting head including a mounting fork affixed to said one end of the handle and including a pair of spaced legs, a journal boss rigid with the free end of each leg and each having a transverse bore therethrough with the axes of such bores being disposed in acutely angulated relationship, a stub shaft rotatably received in each of said bores and the outer free end of each such stub shaft having a cutting disc rigidly affixed thereto, said cutting discs being of a diameter to overlap in close adjacency at one point at the peripheral portions thereof, means for preventing withdrawal of said stub shafts from their respective bores.

2. A twin disc gardening tool comprising an elongate handle having a cutting head affixed to one end thereof, said cutting head including a mounting fork affixed to said one end of the handle and including a pair of spaced legs, a journal boss rigid with the free end of each leg and each having a transverse bore therethrough with the axes of such bores being disposed in acutely angulated relationship, a stub shaft rotatably received in each of said bores and the outer free end of each such stub shaft having a cutting disc rigidly affixed thereto, said cutting discs being of a diameter to overlap in close adjacency at one point at the peripheral portions thereof, means for preventing withdrawal of said stub shafts from their respective bores, each of said discs being of concavo-convex configuration.

3. A twin disc gardening tool comprising an elongate handle having a cutting head affixed to one end thereof, said cutting head including a mounting fork affixed to said one end of the handle and including a pair of spaced legs, a journal boss rigid with the free end of each leg and each having a transverse bore therethrough with the axes of such bores being disposed in acutely angulated relationship, a stub shaft rotatably received in each of said bores and the outer free end of each such stub shaft having a cutting disc rigidly affixed thereto, said cutting discs being of a diameter to overlap in close adjacency at one point at the peripheral portions thereof, means for preventing withdrawal of said stub shafts from their respective bores, one of said discs being of a smaller diameter than the other, the cutting edge of one disc moving in advance of the cutting edge of the other disc to separate and guide material for passage between the discs.

4. A twin disc gardening tool comprising an elongate handle having a cutting head affixed to one end thereof, said cutting head including a mounting fork affixed to said one end of the handle and including a pair of spaced legs, a journal boss rigid with the free end of each leg and each having a transverse bore therethrough with the axes of such bores being disposed in acutely angulated relationship, a stub shaft rotatably received in each of said bores and the outer free end of each such stub shaft having a cutting disc rigidly affixed thereto, said cutting discs being of a diameter to overlap in close adjacency at one point at the peripheral portions thereof, means for preventing withdrawal of said stub shafts from their respective bores, each of said discs being of concavo-convex configuration, one of said discs being of a smaller diameter than the other, the cutting edge of one disc moving in advance of the cutting edge of the other disc to separate and guide material for passage between the discs.

5. A gardening implement comprising an elongate handle having a tool head affixed to one end thereof, said tool head including mounting means fixed to said handle and journal means rotatably receiving a pair of stub shafts disposed in generally acute angularity with respect to each other, a pair of cutting discs fixed respectively to the outer free ends of the stub shafts, said discs being of a diameter to overlap at one point and being fixed to said shafts at their geometrical centers and in normal relation thereto to rotate in fixed planes with the discs presenting a tapered crotch therebetween and a cutting nip at the point of overlap.

6. A gardening implement comprising an elongate handle having a tool head affixed to one end thereof, said tool head including mounting means fixed to said handle and journal means rotatably receiving a pair of stub shafts disposed in generally acute angularity with respect to each other, a pair of cutting discs fixed respectively to the outer free ends of the stub shafts, said discs being of a diameter to overlap at one point and being fixed to said shafts at their geometrical centers and in normal relation thereto to rotate in fixed planes with the discs presenting a tapered crotch therebetween and a cutting nip at the point of overlap, and each of said discs being of concavo-convex configuration.

7. A gardening implement comprising an elongate handle having a tool head affixed to one end thereof, said tool head including mounting means fixed to said handle and journal means rotatably receiving a pair of stub shafts disposed in generally acute angularity with respect to each other, a pair of cutting discs fixed respectively to the outer free ends of the stub shafts, said discs being of a diameter to overlap at one point and being fixed to said shafts at their geometrical centers and in normal relation thereto to rotate in fixed planes with the discs presenting a tapered crotch therebetween and a cutting nip at the point of overlap, and one of said discs being of a smaller diameter than the other, the cutting edge of one disc moving in advance of the cutting edge of the other disc to separate and guide material for passage between the discs.

8. A gardening implement comprising an elongate handle having a cutting head affixed to one end thereof, said cutting head including a mounting fork affixed to said one end of the handle and including a pair of spaced legs, a journal boss rigid with the free end of each leg, each leg having a transverse bore therethrough with the axes of each bore being disposed in acutely angulated relationship, a stub shaft rotatably received in each of said bores with the outer free end of each shaft having a cutting disc rigidly affixed thereto, said discs being of a diameter to overlap at one point and being fixed to said shafts at their geometrical centers and in normal relation thereto to rotate in fixed planes, said discs presenting a tapered crotch therebetween and a cutting nip at the point of overlap, each of said discs being of concavo-convex configuration with the concave surfaces of each facing one another, and each of said discs being ground on its concave side so as to form peripheral cutting edges.

9. The device claimed in claim 8 wherein each of said peripheral cutting edges lies substantially within a plane, and the plane of said larger cutting edge being substantially parallel to the axis of said handle.

References Cited in the file of this patent

UNITED STATES PATENTS

| | | |
|---|---|---|
| 646,506 | Sester | Apr. 3, 1900 |
| 1,916,725 | Harbour et al. | July 4, 1933 |
| 2,634,667 | Woolwine | Apr. 14, 1953 |
| 2,651,905 | Schlueter | Sept. 15 1953 |